United States Patent
Funk et al.

(10) Patent No.: US 7,032,368 B2
(45) Date of Patent: Apr. 25, 2006

(54) ATTACHMENT FOR CONNECTING A DUCT TO A GRASS BAGGER OF A MOWER

(75) Inventors: Edric C. Funk, Burnsville, MN (US); Glenn D. Liubakka, Andover, MN (US); Frank M. Gangi, Grand Rapids, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/434,394

(22) Filed: May 8, 2003

(65) Prior Publication Data

US 2004/0221563 A1    Nov. 11, 2004

(51) Int. Cl.
*A01D 43/00* (2006.01)
*A01D 43/06* (2006.01)

(52) U.S. Cl. ........................................................ 56/202
(58) Field of Classification Search .................. 56/202, 56/320.2, 16.6; 285/903, 921, 305
See application file for complete search history.

(56) References Cited

U.S. PATENT DOCUMENTS

| | | | | |
|---|---|---|---|---|
| 3,132,456 A | * | 5/1964 | Konrad ........................ 56/16.7 |
| 3,367,092 A | * | 2/1968 | Gifford ........................ 56/16.6 |
| 3,716,977 A | | 2/1973 | Jackson |
| 3,785,682 A | * | 1/1974 | Schaller et al. ............... 285/24 |
| 3,934,392 A | | 1/1976 | Moery et al. |
| 4,104,852 A | * | 8/1978 | Tackett ......................... 56/202 |
| 4,142,351 A | * | 3/1979 | Neice et al. ................... 56/202 |
| 4,441,745 A | * | 4/1984 | Nicholas ...................... 285/417 |
| 4,532,755 A | | 8/1985 | Schemelin et al. |
| 4,761,943 A | * | 8/1988 | Parker et al. .................. 56/202 |
| 4,773,205 A | * | 9/1988 | Hansen et al. ............... 56/13.3 |
| 4,881,362 A | * | 11/1989 | Parker et al. .................. 56/202 |
| 4,922,696 A | * | 5/1990 | Burns et al. ................... 56/202 |
| 4,969,670 A | * | 11/1990 | Bonnema et al. ........... 285/319 |
| 5,203,132 A | | 4/1993 | Smolik |
| 5,332,270 A | * | 7/1994 | Petty et al. .................. 285/319 |
| 5,375,399 A | * | 12/1994 | Kraft .......................... 56/16.7 |
| 5,415,436 A | * | 5/1995 | Claes et al. .................. 285/110 |
| 6,179,889 B1 | * | 1/2001 | Liu ............................. 55/368 |
| 6,435,567 B1 | * | 8/2002 | Kikumori et al. ........... 285/319 |

FOREIGN PATENT DOCUMENTS

| | | | |
|---|---|---|---|
| GB | 2014681 A | * | 8/1979 |
| GB | 2180904 A | * | 4/1987 |
| JP | 06303820 A | * | 11/1994 |

OTHER PUBLICATIONS

Webpage showing Goodyear Grassvac hose (admitted prior art).

* cited by examiner

*Primary Examiner*—Árpád Fábián Kovács
(74) *Attorney, Agent, or Firm*—James W. Miller (57) ABSTRACT

An attachment for releasably coupling a conduit or duct on a mower to the grass bagger inlet of a grass bagger. The duct has a front end connected to a cutting deck carried on the mower and a rear end connected to the grass bagger inlet. The duct is flexible and includes a spiral rib on an outer diameter of the duct. The grass bagger inlet includes inwardly protruding tabs on an inner diameter of the grass bagger inlet. When the rear end of the duct is pushed into the grass bagger inlet, the tabs on the grass bagger inlet engage the spiral rib on the duct in a ratchet type engagement to releasably hold the duct in the grass bagger inlet.

1 Claim, 5 Drawing Sheets

ATTACHMENT FOR CONNECTING A DUCT TO A GRASS BAGGER OF A MOWER

TECHNICAL FIELD

This invention relates to a mower having a cutting deck, a grass bagger, and a conduit or duct for conducting grass clippings from the cutting deck to the grass bagger. More particularly, this invention relates to an attachment for connecting the duct to the grass bagger without using any fasteners or clamps.

BACKGROUND OF THE INVENTION

Lawn mowers are known which carry grass baggers for collecting grass clippings. One well known type of grass bagger is mounted at the rear of a riding mower. The bagger has a transversely extending hood behind the mower with a plurality of grass collecting bags received beneath the hood. The grass clippings entering the hood fall out from the hood into the bags. When the bags are filled with grass clippings, the bags can be removed from beneath the hood and emptied. The bags can then be reinstalled beneath the hood to catch and collect more grass clippings.

The grass clippings are directed to the grass bagger from a front mounted cutting deck through an elongated conduit or duct. A blower may be used to help propel the grass clippings through the duct. The front end of the duct is connected to the cutting deck or to the outlet of the blower. The rear end of the duct is connected to the hood of the grass bagger at an inlet.

Typically, the rear end of the duct and the grass bagger inlet have a telescopic attachment where one part is telescoped over the other. For example, the grass bagger inlet often comprises a short pipe or tube over which the rear end of the duct is telescoped. A hose clamp is used around the rear end of the duct to releasably couple the rear end of the duct to the grass bagger inlet. The hose clamp includes a screw that must be tightened to decrease the diameter of the clamp to thereby clamp the rear end of the duct to the grass bagger inlet.

While the use of a clamp to connect the duct to the grass bagger inlet is effective in keeping the duct attached to the grass bagger, it is inconvenient. As the mower is used to cut grass, it is not uncommon for grass plugs to occur at the rear end of the duct or in the grass bagger inlet. A typical grass plug simply comprises a large, compacted mass or body of grass clippings that forms in the duct or inlet. Such a plug prevents the flow of additional grass clippings through the duct and into the bagger. Plugs form more often when relatively damp or wet grass is being cut by the mower.

If a plug should form in the rear end of the duct or in the grass bagger inlet, the plug must be cleared to allow the proper and continued operation of the grass bagger. This is done by disconnecting the rear end of the duct from the grass bagger inlet to allow access to be had to the plug for clearing the plug away. However, to disconnect the rear end of the duct, the tightening screw of the hose clamp must first be loosened to allow the duct to be pulled off the grass bagger inlet. The operator must use a screwdriver to sufficiently loosen the screw on the hose clamp to allow the duct to be disconnected from the grass bagger inlet. Obviously, this requires that the operator both have a screwdriver handy and that the operator use the screwdriver to loosen the tightening screw on the hose clamp.

Moreover, once the hose clamp is loosened, the duct is removed, and the plug cleared, the duct must be reattached to the grass bagger inlet. This requires the operator to telescope the rear end of the duct back over the grass inlet and to then retighten the screw of the hose clamp to hold the duct in place. Thus, to clear a single plug from the rear end of the duct or the grass bagger inlet, the operator must loosen and retighten the hose clamp holding the duct to the grass bagger inlet. At the very least, this is inconvenient and can be quite difficult if the hose clamp has worn or corroded so that the tightening screw is difficult to turn.

It is also not uncommon for plugs at the rear end of the duct and/or in the grass bagger inlet of the grass bagger to occur more than once during a particular mowing job. If the grass conditions are conducive to the formation of plugs, then such plugs may occur relatively frequently. This requires the operator to stop and clear each plug as it occurs, which obviously necessitates loosening and retightening the hose clamp each time. It would be desirable to be able to remove the duct from the grass bagger inlet of the grass bagger more quickly and with less effort.

SUMMARY OF THE INVENTION

One aspect of this invention relates to an attachment for releasably coupling one end of a duct to a cylindrical member on a mower such that the duct transports grass clippings generated by a cutting deck on the mower to a grass bagger on the mower. The attachment comprises a flexible duct having a spiral rib on one diameter of the duct. At least one tab is provided on an opposing diameter of the cylindrical member on the mower. The tab operatively cooperates with the spiral rib in a ratchet engagement to releasably hold the one end of the duct and the cylindrical member together.

Another aspect of this invention relates to an improved mower of the type having a traction frame, a cutting deck carried on the traction frame, a grass bagger carried on the traction frame with the grass bagger having an inlet for receiving grass clippings, and a duct connecting the cutting deck and the grass bagger inlet such that grass clippings generated in the cutting deck are transported by the duct into the grass bagger inlet for deposit within the grass bagger. The duct and the grass bagger inlet have a telescopic attachment with one another formed by an inner diameter concentrically received within an outer diameter. The improvement relates to the telescopic attachment between the duct and the grass bagger inlet and comprises a ratchet engagement between the outer and inner diameters of the telescopic attachment between the duct and the grass bagger inlet. The ratchet engagement is configured to permit the telescopic attachment to be established by manually pushing the duct and the grass bagger inlet together relative to one another, to releasably maintain the telescopic attachment between the duct and the grass bagger inlet once the telescopic attachment is established; and to permit the telescopic attachment to be overcome by manually pulling the duct and the grass bagger inlet apart relative to one another.

Yet another aspect of this invention relates to a mower as described generally above having means for releasably maintaining the telescopic attachment between the duct and the grass bagger inlet without using fasteners or clamps.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
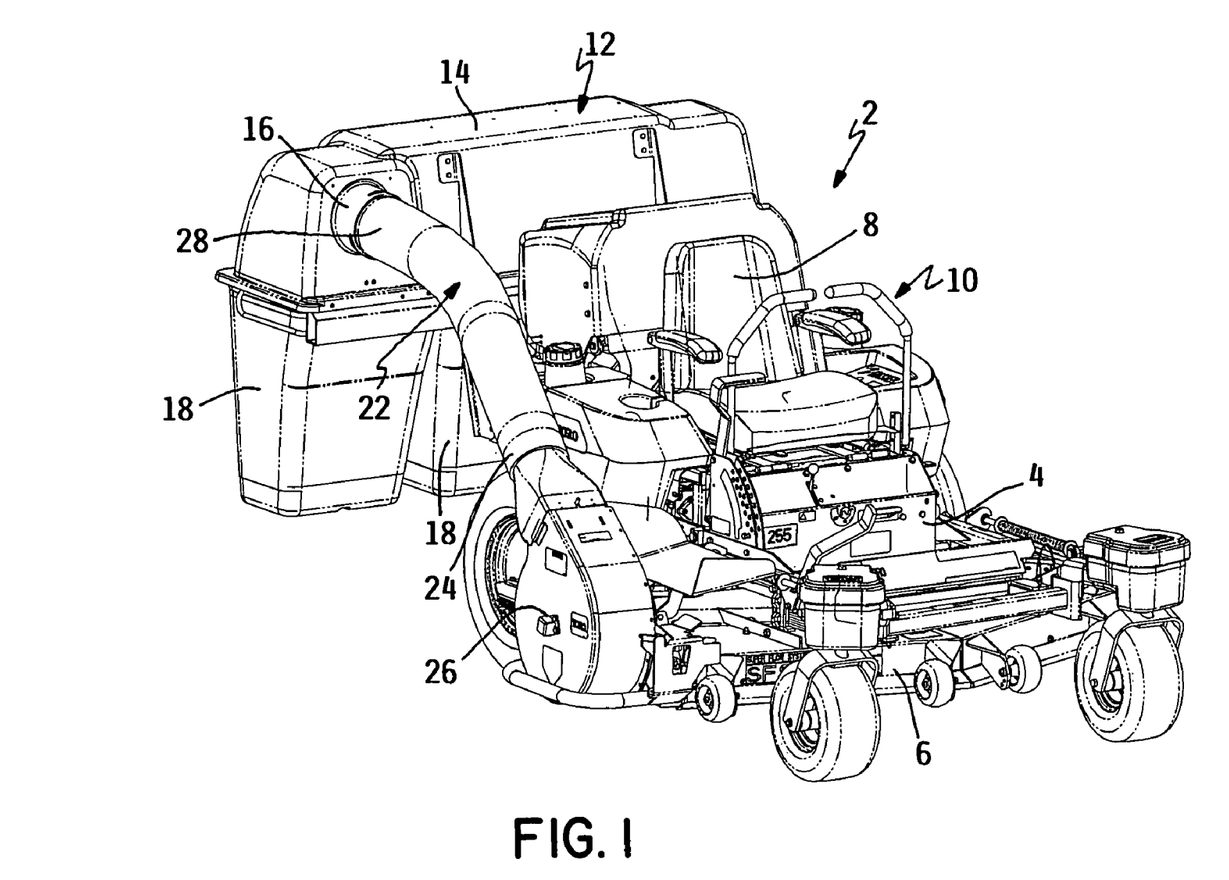
FIG. 1 is a perspective view of a lawn mower according to this invention

A lawn mower of the type to which this invention relates is illustrated as 2 in FIG. 1. Mower 2 includes a traction frame 4 that is suited for movement over the ground. A cutting deck 6 is mounted on the front of traction frame 4. Cutting deck 6 houses one or more rotary blades (not shown) that are rotated in horizontal cutting planes to cut grass and thereby create grass clippings.

Traction frame 4 of mower 2 can comprise a traction vehicle that is controlled by an operator carried on a seat 8 on traction frame 4. Various controls 10 are provided to allow the operator to steer and operate mower 2. However, this invention is not limited to a riding type mower or to the riding mower 2 depicted in the drawings.

A grass bagger 12 is carried at the rear of traction frame 4. Grass bagger 12 includes a transverse hood 14. Grass clippings can enter hood 14 through a generally cylindrical inlet 16. Grass bagger inlet 16 comprises a short tube or pipe that sticks out of a front side of hood 14 towards the front of mower 2.

A plurality of grass collecting bags 18 are suspended or hung from hood 14. Hood 14 forms a transverse trough or channel which receives the grass clippings from grass bagger inlet 16 and which allows the grass clippings to fall out and be deposited in collecting bags 18. Collecting bags 18 may be periodically removed from beneath hood 14, the collected grass clippings dumped from bags 18, and bags 18 then replaced beneath hood 14. Grass baggers 12 of this general type are well known in the mower art.

An elongated flexible conduit or duct 22 connects cutting deck 6 to grass bagger inlet 16. More particularly, the front end 24 of duct 22 is connected to the outlet of a blower 26 attached to one side of cutting deck 6. Blower 26 assists in propelling the grass clippings from cutting deck 6 through duct 22 and into grass bagger 12. While use of a blower 26 is preferred, blower 26 may be dispensed with. In this event, the front end of duct 22 may be connected directly to a discharge outlet on cutting deck 6. In any event, the attachment of the front end 24 of duct 22 may be done in any suitable way, e.g. by using a hose clamp to tighten the front end of duct 22 to the part around which the front end of duct 22 is received, either to the outlet of blower 26 or to the outlet of cutting deck 6.

The rear end 28 of duct 22 is attached to grass bagger inlet 16 of grass bagger 12 using a telescopic attachment in which an outer diameter of duct 22 is concentrically received within an inner diameter of grass bagger inlet 16. Duct 22 includes a spiral rib 30 around the outer diameter thereof and duct 22 is made of a flexible material. Spiral rib 30 has multiple turns and extends over most if not all of the length of duct 22.

Duct 22 itself is not new, but is an off the shelf, commercially available product. One type of duct that is sold is known as the GrassVac hose, which is made and sold by Goodyear. The Goodyear GrassVac hose is sold for lawn, leaf, mulch and yard waste collection applications. However, in the prior art uses of duct 22 as known to the Applicants, the rear end of the Goodyear GrassVac hose was telescopically received around a grass bagger inlet and was secured thereto using the typical hose clamp. The disadvantages in this type of attachment have been previously described in the Background of the Invention section of this patent application.

The Applicants herein realized that the ribbed or corrugated outer diameter of duct 22 could be used as one part of a ratchet engagement between duct 22 and grass bagger inlet 16. The other part of the ratchet engagement is carried on grass bagger inlet 16 of grass bagger 12. Such a ratchet engagement forms the basis of this invention and permits easy and quick connection or disconnection of duct 22 and grass bagger inlet 16, as will be explained in more detail hereafter.

Figure 2:
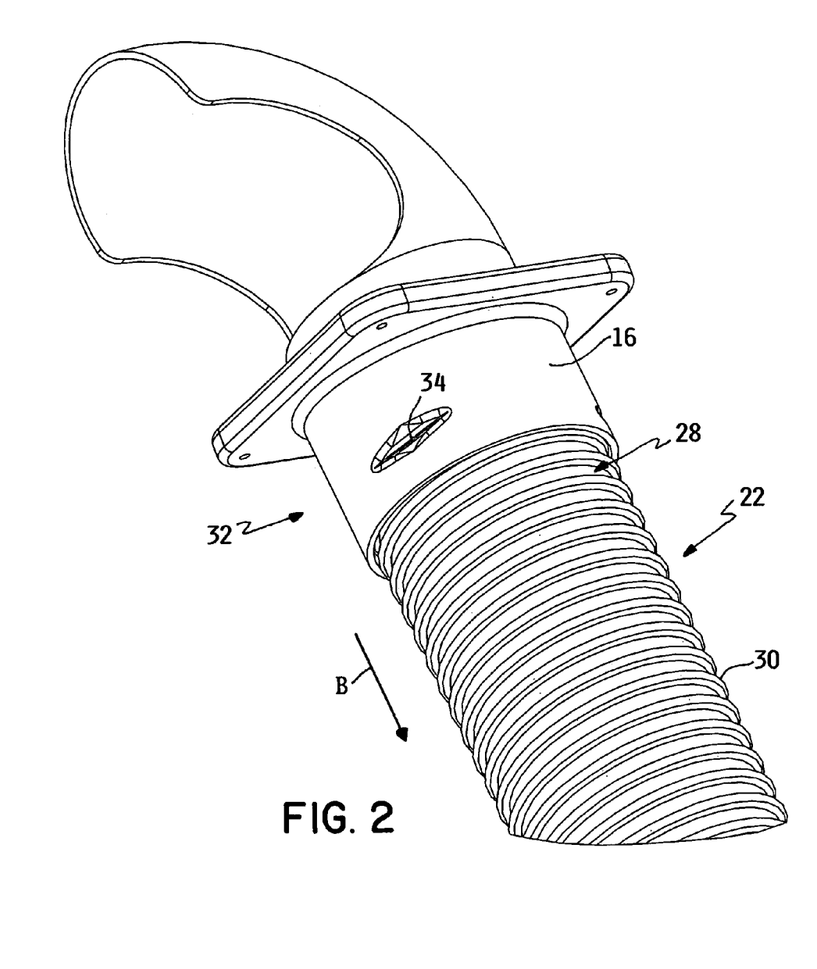
FIG. 2 is an enlarged perspective view of a portion of the lawn mower of FIG. 1, particularly illustrating a first embodiment of an attachment according to this invention for releasably securing a duct to the inlet of a grass bagger with the duct and the grass bagger inlet being shown connected to one another.
Figure 3:
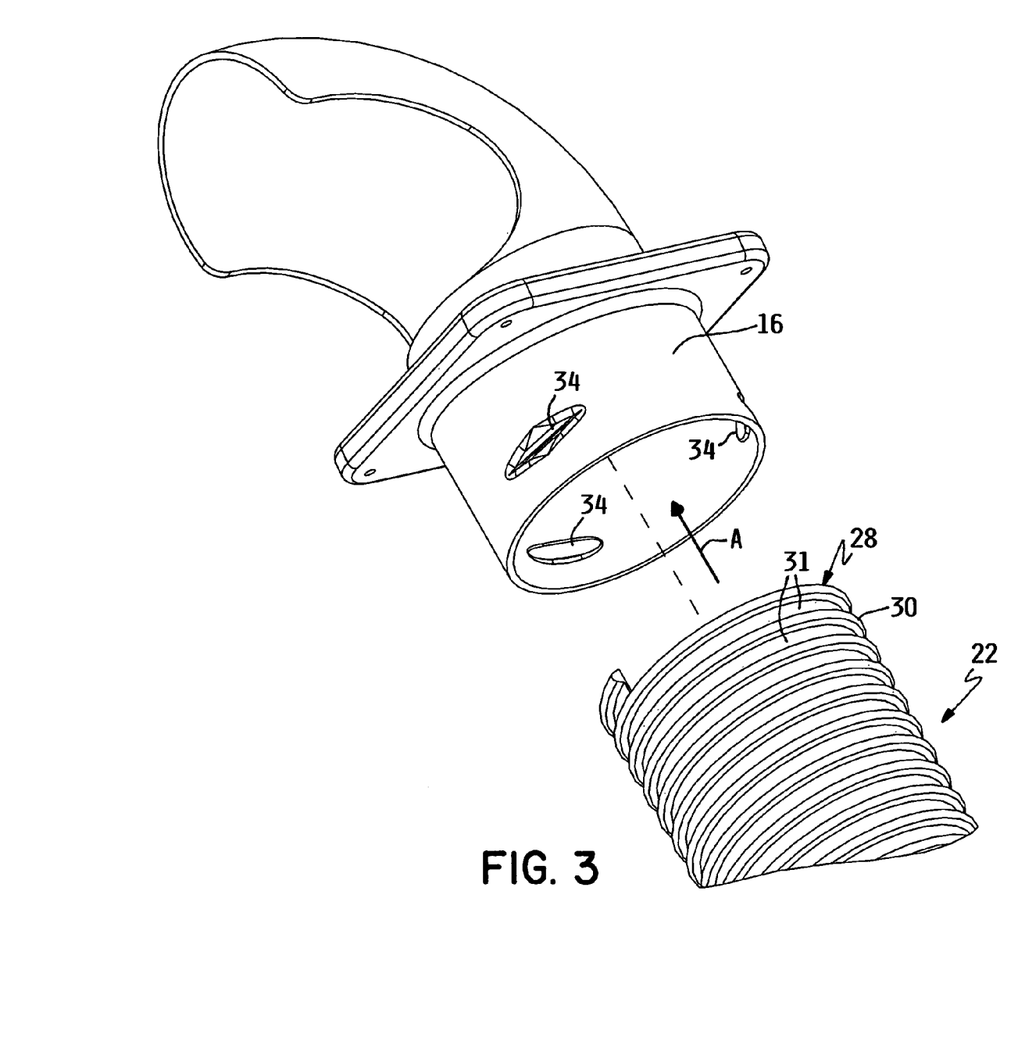
FIG. 3 is an enlarged perspective view similar to FIG. 2, but showing the duct and the grass bagger inlet being separated or disconnected from one another.
Figure 4:
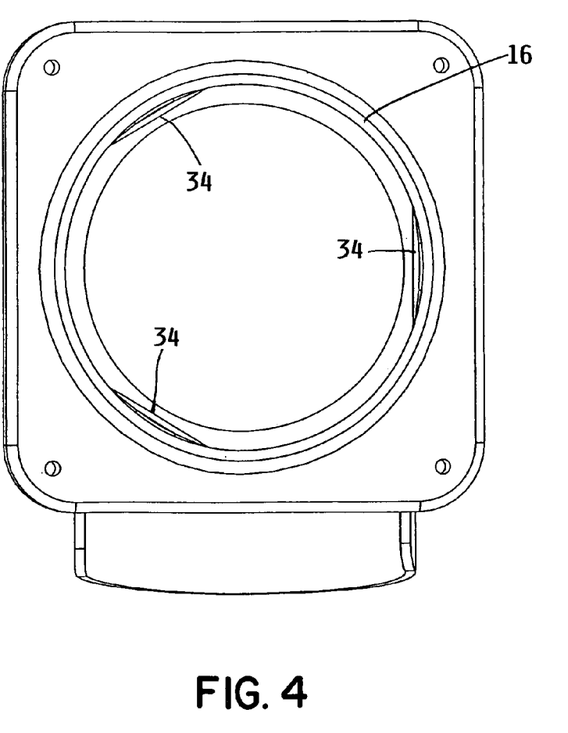
FIG. 4 is a front elevational view of the grass bagger inlet of FIGS. 2 and 3 looking into the mouth of the grass bagger inlet.

Referring now to FIGS. 2–4, an attachment according to this invention is illustrated generally as 32. Attachment 32 includes spiral rib 30 on the outer diameter of duct 22. In addition, attachment 32 includes a plurality of inwardly protruding tabs 34 formed on an inner diameter of grass bagger inlet 16 of grass bagger 12. Tabs 34 on the inner diameter of grass bagger inlet 16 engage with spiral rib 30 on the outer diameter of duct 22 when rear end 28 of duct 22 is telescopically inserted into grass bagger inlet 16.

Tabs 34 carried on the inner diameter of grass bagger inlet 16 could be formed in various ways. Preferably, tabs 34 are formed as spaced sections of the same type of spiral rib 30 used on the outer diameter of duct 22. In other words, each tab 34 will lie on a helix or a spiral that has the same pitch as the spiral rib 30 on duct 22. With this configuration, tabs 34 will lie in grooves between various turns of spiral rib 30. Together, tabs 34 and spiral rib 30 form both parts of a complementary ratchet engagement, tabs 34 forming one part and spiral rib 30 forming the other part.

In connecting duct 22 to grass bagger inlet 16, the operator need only grab rear end 28 of duct 22 and push rear end 28 of duct 22 into grass bagger inlet 16 as represented by the arrow A in FIG. 3. This is permitted because the flexibility in duct 22 will permit duct 22 to flex as the turns in spiral rib 30 pass over the tabs 34 in grass bagger inlet 16. After pushing rear end 28 of duct 22 into grass bagger inlet 16 a short distance, the operator can stop pushing.

Duct 22 will then be retained in grass bagger inlet 16 during operation of mower 2. Tabs 34 engage in a groove or grooves 31 between adjacent turns of the spiral rib to prevent the two parts, namely duct 22 and grass bagger inlet 16 of grass bagger 12, from disconnecting. Thus, an attachment 32 is disclosed which releasably couples duct 22 to grass bagger inlet 16 without using any type of fasteners or clamps, and specifically without using a hose clamp.

If a grass plug should form in rear end 28 of duct 22 or in grass bagger inlet 16, the operator can easily disconnect duct 22 from grass bagger 12 merely by pulling rear end 28 out of grass bagger inlet 16 to break the telescopic attachment between the two. This is represented by the arrow B in FIG. 2. Again, the flexibility in duct 22 allows duct 22 to flex to pass back past tabs 34 in grass bagger inlet 16 of grass bagger 12. Once the grass plug is cleared, the telescopic attachment can be reestablished merely by pushing rear end 28 of duct 22 back into grass bagger inlet 16.

Thus, to insert duct 22 in grass bagger inlet 16, the operator need only push rear end 28 of duct 22 into grass bagger inlet 16 as shown by arrow A. Similarly, to remove rear end 28 of duct 22 from grass bagger inlet 16, the operator need only pull duct 22 out of grass bagger inlet 16 as shown by arrow B. At all other times, the ratchet engagement provided by attachment 32 is sufficient to hold duct 22 within grass bagger inlet 16.

In inserting or removing duct 22 into or out of grass bagger inlet 16, front end 24 of duct 22 can remain attached to blower 26 or cutting deck 6. The flexibility inherent in duct 22 allows duct 22 to flex or bend enough to permit the insertion and removal of rear end 28 of duct into and out of grass bagger inlet 16 without disconnecting front end 24 of duct 22.

The advantages of attachment 32 of this invention should be apparent. No fasteners or hose clamps are required to attach duct 22 to grass bagger inlet 16 of grass bagger 12. Thus, these parts need not be provided. Duct 22 is available with spiral rib 30 already in place on the outer diameter of duct 22. Tabs 34 can easily be integrally molded into a plastic part forming grass bagger inlet 16. Thus, attachment 32 is more economical than attachments using separate fasteners or hose clamps.

Moreover, the time savings from attachment 32 of this invention, particularly in clearing multiple grass plugs as they form, is significant. The time and effort required to loosen and then retighten a hose clamp each time duct 22 needs to be removed from grass bagger inlet 16 of grass bagger 12 is no longer needed. The operator simply has to pull the rear end 28 of duct 22 out of grass bagger inlet 16, clear the plug, and then push rear end 28 duct 22 back into grass bagger inlet 16. This is quick and easy to do.

Figure 5:
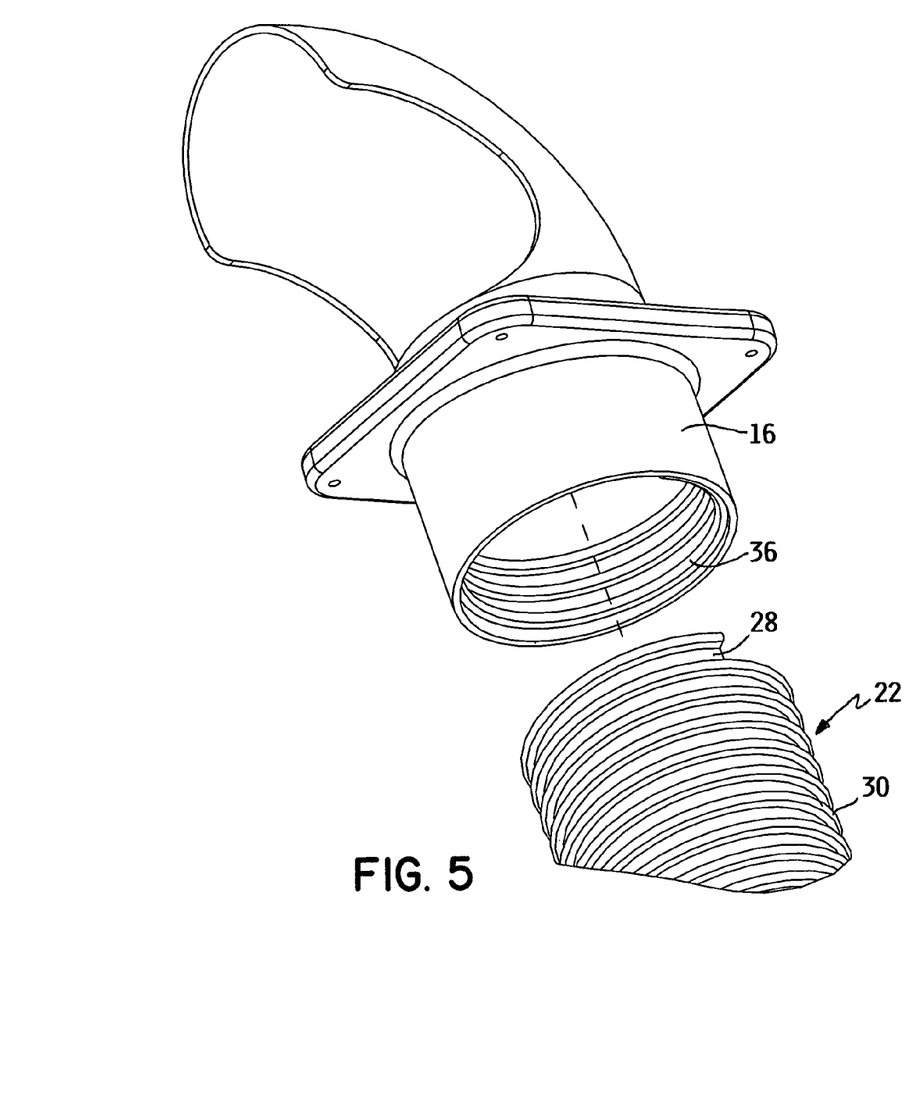
FIG. 5 is an enlarged perspective view similar to FIG. 3, particularly illustrating a second embodiment of an attachment according to this invention for releasably securing a duct to the grass bagger inlet of a grass bagger.

FIG. 5 illustrates an alternative attachment according to this invention. In this alternate, the part of the ratchet engagement carried on the inner diameter of grass bagger inlet 16 is now formed by a few turns of a spiral rib 36 having the same pitch as spiral rib 30 on the outer diameter of duct 22. The discontinuous tabs 34 have been replaced by a continuous spiral rib 36. Spiral rib 36 on the inside diameter of grass bagger inlet 16 could have three turns as shown in FIG. 5, or fewer turns if so desired.

Preferably, spiral rib 36 on the inner diameter of grass bagger inlet 16, as shown in FIG. 5, still engages spiral rib 30 on the outer diameter of duct 22 in a ratchet engagement in which the two parts are simply pushed together or pulled apart using straight line motions represented by arrows A and B. It is not preferred that the two ribs 30 and 36 cooperate in the manner of a screw thread in which rear end 28 of duct 22 screws into grass bagger inlet 16. This is not preferred since such a screwing motion would involve disconnecting the front end 24 of duct 22 from cutting deck 6 to permit rotation of duct 22. Again, straight line motion of duct 22 in and out of grass bagger inlet 16 is preferred.

Various modifications of this invention will be apparent to those skilled in the art. For example, the telescopic attachment 32 between duct 22 and grass bagger inlet 16 be reversed with duct 22 telescoping over the outside of grass bagger inlet 16. This would require the spiral rib 30 on duct 22 be formed on an inner diameter of duct 22 and tabs 34 protrude outwardly from an outer diameter of grass bagger inlet 16. Since the commonly available Goodyear GrassVac hose already has a prominent spiral rib 30 on its outer diameter, it is simpler to form the telescopic attachment 32 by inserting duct 22 into grass bagger inlet 16, rather than over grass bagger inlet 16.

In addition, a ratchet engagement could be formed by parts other than a spiral rib and cooperating tabs. For example, an annular, inwardly protruding detent ring could be formed on the inner diameter of grass bagger inlet 16 which ring would catch on the teeth of one or more toothed bars extending longitudinally along the rear end 28 of duct 22. Moreover, attachment 22 could also be used to couple either end 24 or 28 of duct 22 to mower 2, and not just the rear end 28 of duct 22 to grass bagger inlet 16. Accordingly, the invention is to be limited only by the appended claims.

We claim:

1. An improved mower of the type having a traction frame, a cutting deck carried on the traction frame, a grass bagger carried on the traction frame with the grass bagger having an inlet for receiving grass clippings, a duct connecting the cutting deck and the grass bagger inlet such that grass clippings generated in the cutting deck are transported by the duct into the grass bagger inlet for deposit within the grass bagger, wherein the improvement comprises:

(a) flexible duct having a spiral rib on an outer diameter of the duct, the spiral rib on the duct having a plurality of turns forming a plurality of groves between adjacent turns of the rib; and (b) at least portions of a spiral rib integrally and rigid carried on an inner diameter of the grass bagger inlet so as to be fixed and non-movable in a radial direction, wherein the rigid portions of the spiral rib on the grass bagger inlet are shaped relative to the spiral rib on the duct to slidably ratchet over the turns of the spiral rib on the duct while engaging against the turns of the spiral rib on the duct until the rigid portions of the spiral rib on the grass bagger inlet are releasably received in a groove or grooves between adjacent turns of the spiral rib on the duct, and wherein the slidable ratchet action is permitted only by the flexibility of the duct with the duct being sufficiently inwardly movable in a radial direction to ratchet beneath and past the radially non-movable, rigid portions of the spiral rib on the grass bagger inlet as the duct is pushed into or pulled out of the grass bagger inlet, the duct then radially expanding into a state where the duct is not substantially inwardly deformed when the ratchet engagement is completed to avoid substantial restrictions in a grass clipping carrying capacity of the duct.

* * * * *

UNITED STATES PATENT AND TRADEMARK OFFICE
CERTIFICATE OF CORRECTION

PATENT NO. : 7,032,368 B2 Page 1 of 1
APPLICATION NO. : 10/434394
DATED : April 25, 2006
INVENTOR(S) : Edric C. Funk et al.

It is certified that error appears in the above-identified patent and that said Letters Patent is hereby corrected as shown below:

Col. 6, Line 35, change "groves" to --grooves--.

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 7,032,368 B2
APPLICATION NO. : 10/434394
DATED : April 25, 2006
INVENTOR(S) : Edric C. Funk et al.

It is certified that error appears in the above-identified patent and that said Letters Patent is hereby corrected as shown below:

Col. 6, Line 37, change "rigid" to -- rigidly --.

Signed and Sealed this

Twenty-second Day of August, 2006

JON W. DUDAS
*Director of the United States Patent and Trademark Office*